United States Patent [19]

Wolf

[11] Patent Number: 4,576,138

[45] Date of Patent: Mar. 18, 1986

[54] CAPACITOR DISCHARGE IGNITION SYSTEM WITH IMPROVED CONTROL CIRCUIT

[75] Inventor: Ronald J. Wolf, Zanesville, Ind.

[73] Assignee: Wabash, Inc., Huntington, Ind.

[21] Appl. No.: 755,208

[22] Filed: Jul. 12, 1985

Related U.S. Application Data

[63] Continuation of Ser. No. 488,212, Apr. 25, 1983, abandoned, and a continuation-in-part of Ser. No. 382,679, Mar. 27, 1982, abandoned, which is a continuation-in-part of Ser. No. 331,293, Dec. 16, 1981, abandoned.

[51] Int. Cl.$^4$ ............................................. F02P 5/145
[52] U.S. Cl. .................................... 123/600; 123/418; 123/602
[58] Field of Search ............... 123/418, 602, 599, 630, 123/149 C, 335, 600

[56] References Cited

U.S. PATENT DOCUMENTS

| | | | |
|---|---|---|---|
| 3,861,372 | 1/1975 | Shibukawa et al. | 123/602 |
| 3,866,589 | 2/1975 | Haubner et al. | 123/418 |
| 3,898,972 | 8/1975 | Haubner | 123/602 |
| 4,132,208 | 1/1979 | Yukawa | 123/602 |
| 4,202,305 | 5/1980 | Wolf | 123/599 |
| 4,324,215 | 4/1982 | Sieja | 123/335 |
| 4,343,273 | 8/1982 | Kondo et al. | 123/600 |
| 4,385,601 | 5/1983 | Orova et al. | 123/418 |
| 4,385,617 | 5/1983 | Nakata et al. | 123/418 |

FOREIGN PATENT DOCUMENTS

| | | | |
|---|---|---|---|
| 55-5450 | 1/1980 | Japan | 123/418 |

Primary Examiner—Andrew M. Dolinar
Attorney, Agent, or Firm—Mason, Kolehmainen, Rathburn & Wyss

[57] ABSTRACT

A capacitor discharge ignition system is provided with an improved control circuit to achieve predetermined ignition timing characteristics over the range of engine speed operation. In one arrangement the improved control circuit provides engine speed control by introducing a relatively abrupt or stepped ignition timing retard characteristic when a predetermined engine speed is exceeded. If the engine speed increases above the predetermined speed at which the ignition retard characteristic is introduced, additional retarding of the ignition timing is provided. In another arrangement, the control circuit provides an abrupt or stepped ignition timing advance characteristic when a predetermined ignition speed is exceeded. In yet another arrangement, the control circuit first provides the stepped advance as a first predetermined speed is exceeded and then provides a retard characteristic as a second predetermined speed is exceeded greater than the first predetermined speed. The capacitor discharge ignition system is positioned adjacent a rotating permanent magnet that is rotated over a path in synchronism with the operation of an engine to be controlled. The capacitor discharge ignition system includes a core having disposed thereon an ignition coil and a control coil. The control circuit in a specific embodiment of the first arrangement includes a varistor and a capacitor which are selected in the first arrangement to provide the desired retard characteristics to the ignition timing.

36 Claims, 10 Drawing Figures

CAPACITOR DISCHARGE IGNITION SYSTEM WITH IMPROVED CONTROL CIRCUIT

CROSS REFERENCE TO RELATED APPLICATIONS

This application is a continuation of application Ser. No. 488,212, filed Apr. 25, 1983, now abandoned, and a continuation-in-part of application Ser. No. 382,679 filed on Mar. 27, 1982 and now abandoned, application Ser. No. 382,679 being a continuation-in-part of application Ser. No. 331,293 filed on Dec. 16, 1981 and now abandoned.

BACKGROUND OF THE INVENTION

A. Field of the Invention

This invention relates generally to capacitor discharge ignition systems and more particularly to ignition control arrangements to achieve desired timing characteristics and engine control.

B. Description of the Prior Art

Various capacitor discharge ignition systems of the prior art have been developed to provide a breakerless ignition system for the control of an engine whereby an appropriately timed signal is supplied to the primary winding of an ignition coil to induce a high voltage in a secondary winding of the ignition coil to fire a spark plug or spark plugs associated with the engine. Examples of these various capacitor discharge ignition systems are disclosed in U.S. Pat. Nos. 4,228,780, 4,202,305, 3,941,111, 4,056,088 and 4,036,201.

Additionally, various capacitor discharge ignition systems of the prior art have been developed to provide predetermined ignition timing characteristics. These prior art arrangements are directed to achieving predetermined ignition timing characteristics including both advancing and retarding of the ignition signal for predetermined operating parameters of the engine as well as achieving a stable ignition timing characteristic over predetermined operating ranges of an engine.

For example, the aforementioned U.S. Pat. No. 4,202,305 discloses an arrangement for providing a stable ignition timing characteristic over a wide operating range of engine speed. Further, the aforementioned U.S. Pat. No. 4,228,780 discloses an arrangement for providing a predetermined ignition timing retard characteristic with increasing engine speed operation.

Other timing control arrangements of the prior art to achieve various predetermined timing characteristics are disclosed in U.S. Pat. Nos. 4,074,669, 3,667,441, 3,703,889, 4,132,208, 3,941,110, 3,722,488, 4,108,131, 4,029,998, 3,515,109, 3,447,521, 3,500,809 and 3,465,739.

These prior art arrangements are directed to various techniques for the control of engine timing characteristics including: the generation of various pulses in accordance with the shape of the rotating magnet pole shoes; a plurality of magnets arranged around a flywheel for the generation of various additional timing pulses; the change in trigger voltage obtained as a variation of engine speed; two or more coils for developing trigger pulses; and various electronic trigger control circuits operating in combination with the variation in pulses obtained in the capacitor discharge ignition system as a function of engine speed.

For example, U.S. Pat. No. 4,132,208 is directed to a provision of electronic control circuits including a phase advanced signal generating circuit with phase angle control and an angle retarding circuit for the controlled timing.

Further U.S. Pat. No. 3,941,110 is directed to the provision in various embodiments of control circuits including RC components, zener diodes and multivibrator stages that are responsive to control timing in response to the change in trigger waveforms as a function of engine speed.

Further, various other prior art arrangements are disclosed that propose a variety of mechanical and electrical arrangements to relatively abruptly alter timing characteristics either as a retard or an advance in response to sensed engine RPM or induced voltages reflecting engine RPM as disclosed in U.S. Pat. Nos. 4,174,697, 4,252,095, 4,335,692, 4,306,535, 4,195,603, 3,752,139, 4,140,092, 4,282,839, 3,320,770, 4,154,201, 3,703,887, 3,626,455, 3,874,350, 4,099,498 and 3,653,367.

For example, U.S. Pat. No. 4,174,697 is directed to an electrical circuit arrangement in a magneto generator for introducing an abrupt advance in ignition timing. At a predetermined speed, the time between the breakdown of a threshold element and the furnishing of the signal which causes interuption of the primary current is decreased. The time is shortened either by decreasing the time constant of the timing circuit connected to the threshold element, or by switching a second timing circuit into the circuit having a shorter time constant.

U.S. Pat. No. 4,252,095 utilizes an RPM sensing circuit output to switch control from one timing control circuit to another retard timing control circuit to introduce an ignition retard above a predetermined speed.

U.S. Pat. No. 4,335,692 is directed to a circuit arrangement for introducing a relatively abrupt retard in ignition timing at a predetermined engine RPM that increases with increasing RPM. A pick-up coil and rectifier-limiter circuit, separate from the charge coil, provide a variable trigger signal to the CID system.

While these prior art arrangements are generally suitable for their intended purpose to provide engine timing control, it is desirable to provide improved timing control circuits and capacitor discharge ignition systems.

SUMMARY OF THE INVENTION

Accordingly, it is a principal object of the present invention to provide a capacitor discharge ignition system with an improved timing control circuit to achieve predetermined ignition timing characteristics including an abrupt or stepped ignition retard characteristic that is provided for engine speeds in excess of a predetermined speed.

It is another object of the present invention to provide an engine speed control arrangement in a capacitor discharge ignition system that operates as a speed limiter to prevent excessively high engine speeds.

It is another object of the present invention to provide a capacitor discharge ignition system with an improved timing control circuit to achieve an abrupt or stepped ignition timing advance characteristic for engine speeds within a predetermined operating range.

Briefly these and other objects of the present invention are achieved by providing a capacitor discharge ignition system with an improved timing control circuit to achieve predetermined ignition timing characteristics over the range of engine speed operation. In one arrangement the improved control circuit provides engine speed control by introducing a relatively abrupt or stepped ignition timing retard characteristic when a predetermined engine speed is exceeded. If the engine speed increases above the predetermined speed at which the ignition retard characteristic is introduced, additional retarding of the ignition timing is provided. In another arrangement, the control circuit provides an abrupt or stepped ignition timing advance characteristic when a predetermined ignition speed is exceeded. In yet another arrangement, the control circuit first provides the stepped advance as a first predetermined speed is exceeded and then provides a retard characteristic as a second predetermined speed is exceeded greater than the first predetermined speed. The capacitor discharge ignition system is positioned adjacent a rotating permanent magnet that is rotated over a path in synchronism with the operation of an engine to be controlled. The capacitor discharge ignition system includes a core having disposed thereon an ignition coil and a control coil. As the magnet passes the core, a charging voltage of a first polarity is induced in the control coil and the resulting current generated in the control coil charges a storage capacitor. After the generation of the voltage of the first polarity, a triggering voltage of the opposite polarity is induced in the control coil and a resulting current is generated in the control coil. The control circuit is responsive to the resulting current from the induced triggering voltage of the opposite polarity to control the discharge of the capacitor into a primary winding of an ignition coil. An induced voltage and current in a secondary winding in the ignition coil provides suitable power conditions to fire a spark plug connected across the secondary winding. The control circuit in a specific embodiment of the first arrangement includes a varistor and a capacitor which are selected in the first arrangement to provide the desired retard characteristics to the ignition timing. In other specific embodiments of the first arrangement, a bilaterial switch, other threshhold switching devices, or back to back zener diodes are provided instead of the varistor. Thus, the first arrangement includes a control arrangement and a capacitor. In the second arrangement, the control arrangement and capacitor of the control circuit function to delay the discharge of the capacitor into the primary winding when the predetemined engine speed is exceeded. The capacitor is then discharged into the primary winding in response to an additional induced triggering voltage in the control winding of opposite polarity to said charging voltage and occurring before the charging voltage.

BRIEF DESCRIPTION OF THE DRAWING

The invention both as to its organization and method of operation together with further objects and advantages thereof will best be understood by reference to the following specification taken in connection with the accompanying drawings in which.

DESCRIPTION OF THE PREFERRED EMBODIMENT

Figure 1:
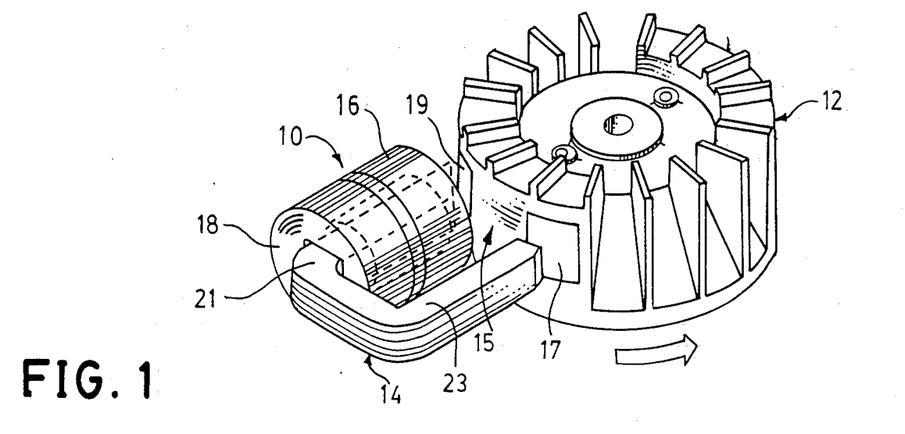
FIG. 1 is a perspective view of the capacitor discharge ignition system of the present invention for operation adjacent a flywheel of an engine.
Figure 2:
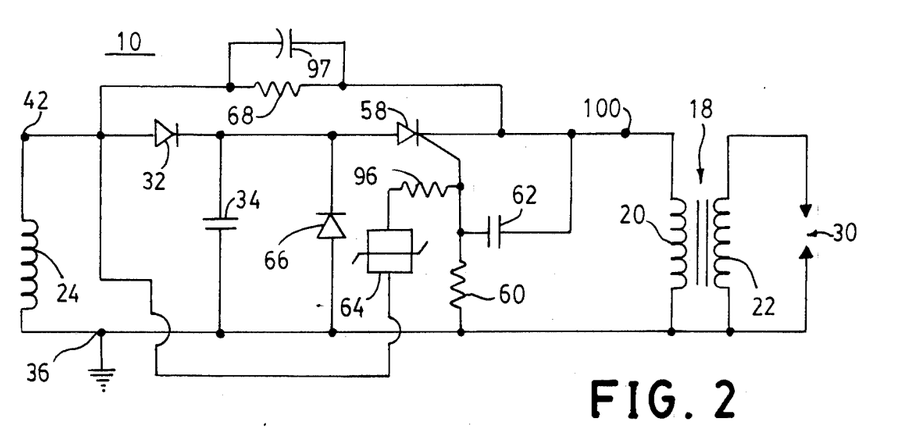
FIG. 2 is an electrical schematic diagram of the capacitor discharge ignition system of the present invention as shown in FIG. 1.

Referring now to the drawings wherein like reference numerals refer to like elements and components throughout and more particularly to FIG. 1, the capacitor discharge ignition (CDI) system of the present invention referred to generally at 10 is shown in operative position adjacent a flywheel 12 of an engine. The flywheel 12 carries a permanent magnet referred to generally at 15 that energizes the CDI system 10 upon rotation of the flywheel 12. The permanent magnet 15 includes two magnet pole faces or pieces 17 and 19. The CDI system 10 of FIG. 1 includes a generally U-shaped stator core 14. In other embodiments, the core 14 includes other multiple legged configurations. A control coil 16 and an ignition coil 18 are disposed on one leg of the stator core 14. Referring now additionally to FIG. 2, the ignition coil 18 includes a primary winding 20 and a secondary winding 22. The control coil 16 includes a control winding 24. In a specific embodiment, the primary winding 20 and the secondary winding 22 are concentrically arranged on the stator core 14 with the charge coil 16 disposed along the stator core 14 adjacent the ignition coil 18.

The ignition coil 18 of the CDI system 10 of tne present invention is arranged to fire a spark plug generally indicated at 30 and connected across the secondary winding 22. The control winding 24 at one end referred to at reference point 42 is connected to a diode 32 arranged anode to cathode to one end of a charging capacitor 34. The other end of the capacitor 34 and the other end of the control winding 24 are connected to a ground reference indicated generally at 36.

Figure 3:
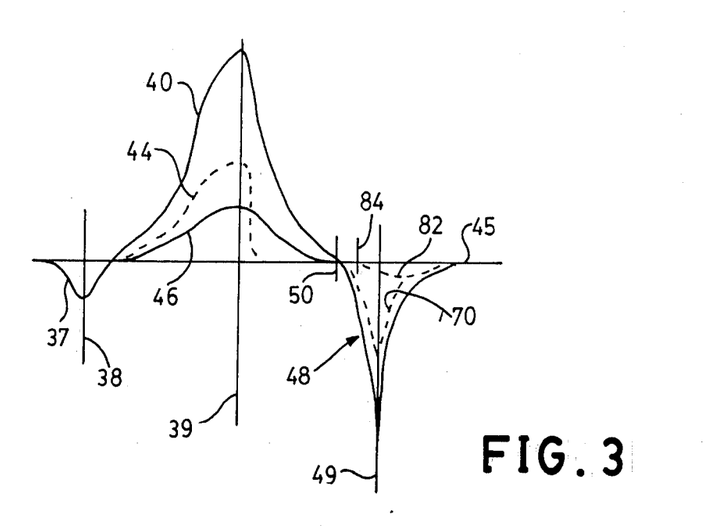
FIG. 3 is a graphic representation of the voltage and current waveforms present during the operation of the capacitor discharge ignition system of FIG. 2.

Referring now additionally to FIG. 3, during operation of the CDI system 10, as the leading magnet pole 17 of the permanent magnet 15 first approaches the core leg 21, a voltage is induced in the control winding 24 represented graphically by the waveform 37. The voltage waveform 37 is referenced to the coil end 42 of the control winding 24. As the leading magnet pole 17 approaches the second core leg 23 and as the trailing magnet pole 19 approaches the first core leg 21, a voltage of opposite polarity to that of waveform 37 is induced in the control winding 24 represented graphically by the waveform 40. The voltage waveform 40 is also referenced to the coil end 42 of the control winding 24. A corresponding current represented by the waveform 44 of FIG. 3 flows through the diode 32 to charge the capacitor 34. As the leading magnet pole 17 moves away from the second core leg 23, the induced voltage in the control winding and the corresponding current flowing into the capacitor 34 will decrease as shown by the respective waveforms 40 and 44 in FIG. 3. As the leading magnet pole pole 17 moves past the stator core 14, a voltage will also be induced in the primary winding 20 of the ignition coil 18 as represented by the waveform 46 in FIG. 3

The reference line 39 of FIG. 3 corresponds approximately to the rotational position when the leading pole 17 is substantially aligned with the second core leg 23 and the trailing magnet pole 19 is substantially aligned with the first core leg 21. Further, reference line 38 of FIG. 3 corresponds to the rotational position when the leading magnet pole 17 is substantially aligned with the first core leg 21. Due to the presence of the diode 32, the charge on the capacitor 34 will be retained. Thus, in FIG. 3 the vertical axis or ordinate of the graphic representation illustrates the magnitude of the voltage or current of the respective waveforms 37, 40, 44 and 46, and the horizontal axis or abscissa 45 represents the angular rotation of the flywheel 12.

As the permanent magnet 15 moves past the stator core 14, the polarity of the induced voltage in the control winding 24 reverses and a voltage is induced in the control winding 24 of the opposite polarity with respect to the coil end 42 as represented graphically by the waveform 48 in FIG. 3. The reference line 49 corresponds to the rotational position when the trailing magnet pole 19 is substantially aligned with the second core leg 23. As the trailing magnet pole 19 moves past the second core leg 23 and away from the stator core 14, the induced voltage waveform 48 returns towards the base line 45. The reference line 50 corresponds to the change in polarity of the induced voltages 40 and 48.

Referring now again to FIG. 2, the primary winding 20 is connected between the ground reference 36 and the cathode of a control switch or SCR 58 with the connection point being identified as the reference point 100. The junction of the charging capacitor 34 and the cathode of the diode 32 is connected to the anode of the SCR 58. The gate or control electrode of the SCR 58 is connected through a resistor 60 to the ground reference 36. A timing control capacitor 62 is connected between the gate and cathode electrodes of the SCR 58. A control arrangement such as a varistor 64 is connected between the gate electrode of the SCR 58 and the reference point 42 of the control winding 24.

In other specific embodiments, the control arrangement includes bilateral switches, other threshhold switching devices or non-linear resistors, or back to back zener diodes. Thus, the control arrangement provides a variable conduction characteristic and/or a voltage dependent variable impedance.

A diode 66 is connected in anode to cathode fashion between the ground reference 36 and the anode of the SCR 58 to shunt high voltage ringing after the discharge of the capacitor 34 and to protect the SCR 58 from excessive reverse voltages. A resistor 68 is connected between the coil end 42 of the control winding 24 and the cathode of the SCR 58.

In the arrangement of FIG. 2, the primary winding 20 and the control winding 24 are arranged to have induced voltages of a common polarity with respect to the coil end 42 of the control winding 24 and the coil end 100 of the primary winding 20.

Referring again to FIG. 3 and considering the operation of the CDI system 10, during the generation of the induced voltage 48 in the control winding 24, the capacitor 34 is isolated from the control winding 24 and the remaining circuit is inductive. The resultant current flowing from the control winding 24 during the generation of the voltage waveform 48 is represented by the waveform 82 of FIG. 3 with the current appreciably lagging the voltage waveform 48. The resultant current 82 flows through the resistor 60 to charge the capacitor 62 in accordance with the RC time constant of the resistor 60 and the capacitor 62.

Operation of the CDI system 10 in accordance with the voltage waveform 48 of FIG. 3 corresponds to the induced voltage in the control winding 24 at a relatively high speed of engine operation such as 7500 rpm. Consequently, at lower speeds of engine operation, for example, at 3500 rpm, the voltage induced in the control winding 24 is represented by the waveform 70 shown dotted in FIG. 3. Of course, it should also be appreciated that the induced voltages 37, 40 and 48 are substantially proportional to the speed of engine operation with higher speed operation resulting in higher amplitude voltage waveforms of approximately the same shape as depicted in FIG. 3.

The SCR 58 is triggered when the appropriate combination of triggering voltage and triggering current are simultaneously present across the gate to cathode junction of the SCR 58. Upon the triggering of the SCR 58, the capacitor 34 is discharged into the primary winding 20 of ignition coil 18. The discharge of the capacitor 34 that occurs into the primary winding 20 induces a high voltage pulse in the secondary winding 22 of the ignition coil to provide the appropriate power conditions to fire the spark plug connected at 30 across the secondary winding 22.

Figure 4:
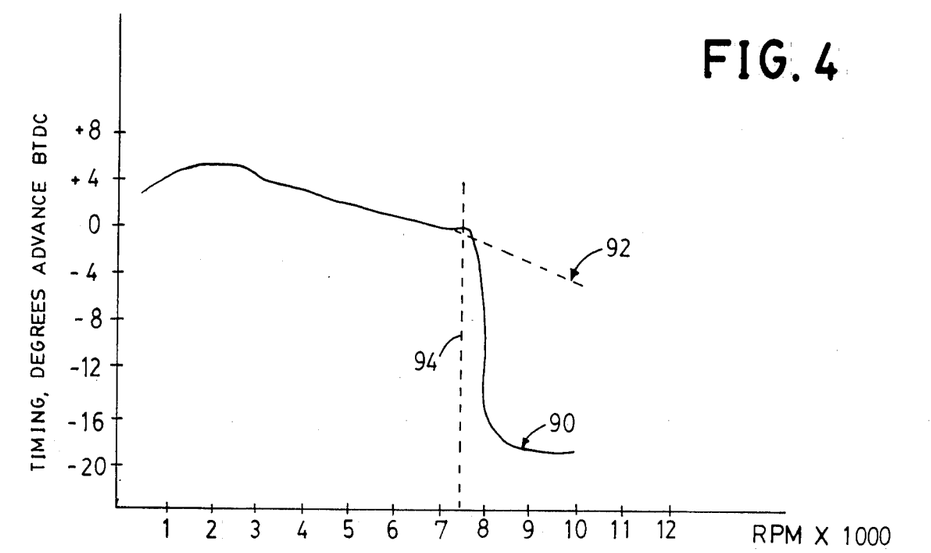
FIG. 4 is a graphic representation of the ignition retard timing characteristics with respect to engine speed provided by the capacitor discharge ignition system of FIGS. 1 and 2 in accordance with a first embodiment of the present invention.

In accordance with important aspects of the present invention, and referring to FIG. 4, the ignition timing characteristics of the CDI system 10 over the operating range of engine speed is depicted by a typical timing curve 92 without the presence of the capacitor 97, the capacitor 62 and the varistor 64 or other control arrangement. In FIG. 4, the ignition timing in degrees is plotted along the vertical axis or ordinate and the engine speed in RPM is plotted along the horizontal axis or abscissa. Thus, the curve 92 represents the variation in ignition timing of the CDI system 10 without the provision of the capacitor 62 and the varistor 64 or other control arrangement.

The ignition timing retatdation of approximately 5 or 6 degrees at 12,000 rpm is a consequence of a later triggering of the SCR 58 as measured by angular revolution of the flywheel 12 due to the phase difference of the current waveform 82 with respect to the voltage waveform 48. The triggering point at one specific speed of engine operation is depicted in FIG. 3 at triggering point 84. Thus, the triggering point 84 will occur at different angular positions of the flywheel 12 along the base line axis 45. The change in triggering point occurs due to the time lag produced by the phase difference between the current waveform 82 and the voltage waveform 48 in the control winding 24. Of course, it should also be understood that the resistor 60 and capacitor 62 also affects the change in ignition timing over speed in accordance with the RC time constant as a rate of charge characteristic.

Considering now operation of the CDI system 10 with the provision of the capacitor 62 and the varistor 64 or other control arrangement and in accordance with the characteristics of the varistor 64 or other control arrangement, as the induced voltage in the control winding 24 increases with speed as depicted for example by the waveform 48 corresponding to higher speed operation, the varistor 64 conducts as a predetermined engine operating speed is exceeded. Thus, the trigger point 84 of the SCR 58 occurs substantially later in time. For example, the CDI system 10 with the provision of the capacitor 62 and the varistor 64 or other control arrangement provides ignition timing characteristics depicted by the curve 90 in FIG. 4 with an abrupt or stepped ignition retard characteristic being introduced at a predetermined speed denoted at 94.

Since a varistor is a voltage dependent, nonlinear resistor that exhibits negligible current flow and high impedance below its rated voltage level and a variable impedance when the voltage across the varistor device exceeds the rated voltage level, the predetermined speed 94 at which the stepped retard characteristics are introduced in the timing waveform 90 is selectively variable in accordance with the voltage rating of the particular varistor device 64 that is utilized in conjunction with the induced voltage characteristics of the control winding 24 versus speed and the control circuit components of resistor 60 and capacitor 62.

For example, in a specific embodiment of the CDI system 10 of the present invention, the following parameters have been found to be suitable although they are illustrative only and should not be interpreted in a limiting sense:

Resistor 60—6.8 K ohms
Capacitor 62—0.018 microfarads
Varistor 64—180 volt device, available from General Electric, series GE - MOV II (Registered Trademark)
Control winding 24—1500 to 2000 turns.

Thus, for the specific embodiment of the CDI system 10 resulting in engine timing characteristics illustrated by the waveform 90 of FIG. 4, when the engine exceeds a predetermined speed of approximately 7500 rpm, an abrupt step of the ignition timing of approximately 15 to 20 degrees or more of retard from the engine timing characteristic 92 is provided as a predetermined engine speed is slightly exceeded. For example, in the operating range of approximately 7500 to 8500 rpm, the ignition timing characteristic is retarded approximately 15° to 20° as compared to operation without the provision of the varistor 64 and capacitor 62.

Thus in accordance with the CDI system 10 of the present invention, a selectively variable ignition retard characteristic is introduced in a stepped or abrupt fashion at a selected predetermined engine operating speed. Accordingly, engine speed control is provided by the CDI system 10 of the present invention to limit excessive operating speeds. Such engine speed control is desirable for example in engine applications such as power saws, plastic cord grass cutters and the like wherein a no load engine condition may occur and excessive engine speed is preferably avoided. The number of degrees of ignition retardation introduced in the stepped or abrupt fashion in the ignition timing characteristic is variable in accordance with the component values of resistor 60 and capacitor 62. Additionally, in a specific embodiment, a resistor 96 is provided in series with the varistor 64 for current limiting, if desired.

In accordance with other important aspects of the present invention, a capacitor 97 is provided in parallel with the resistor 68. With the provision of the capacitor 97, the amount of ignition retardation can be increased as compared to the illustration of FIG. 4 for the CDI system 10 without the capacitor 97. For example, a retard of 20° to 30° is achieved with a component value of the capacitor 97 equal to 0.022 microfarads.

Figure 7:
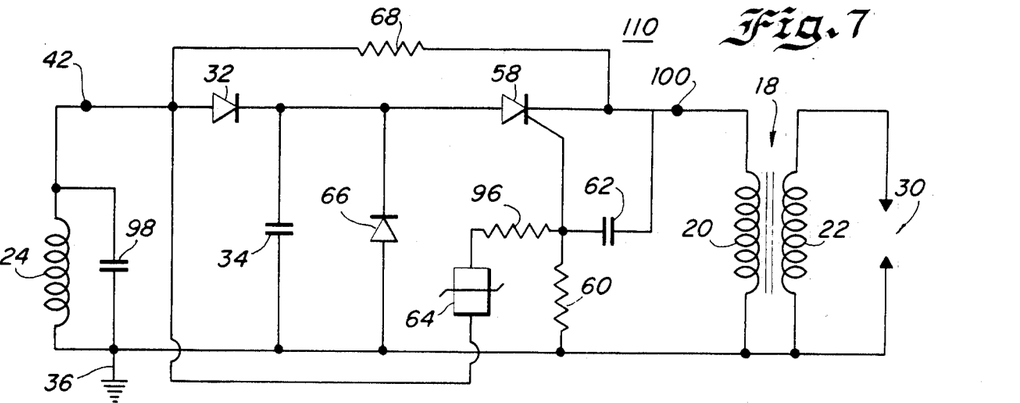
FIG. 7 is an electrical schematic diagram of an alternate embodiment of the capacitor discharge ignition system of the present invention.

Considering an alternate arrangement of the CDI system 10 and referring now to FIG. 7, the CDI system 110 is identical to the CDI system 10 of FIG. 2 except for the provision of a capacitor 98 being connected across the control winding 24 and the deletion of the capacitor 97. Operation of the CDI system 110 is similar to that of the CDI system 10 as discussed hereinbefore and as depicted in FIG. 4. Further, the additional ignition timing retardation obtained by the provision of the capacitor 97 in FIG. 2 is also achieved by the provision of the capacitor 98 in FIG. 7.

Figure 5:
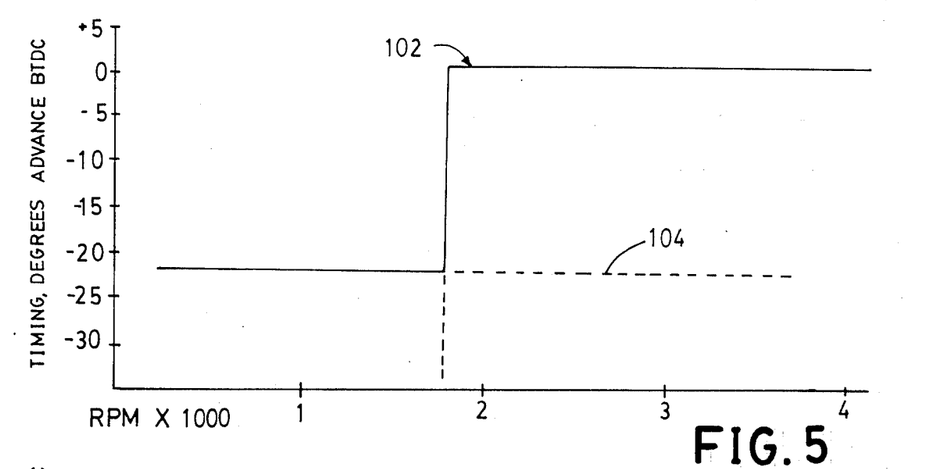
FIG. 5 is a graphic representation of the ignition advance timing characteristics with respect to engine speed provided by the capacitor discharge ignition system of FIGS. 1 and 2 in accordance with a second embodiment of the present invention.

In accordance with yet other important aspects of the present invention, the CDI system 10 of FIG. 2 is selectively operable to provide a rapid advance characteristic when a predetermined engine speed is exceeded. For example, and referring now to FIG. 5, in another arrangement of the CDI system 10 of the present invention without the provision of the capacitor 97, it has been found that if the component values of resistor 60 and capacitor 62 are appropriately selected, the ignition timing characteristic 102 of FIG. 5 is achieved with an abrupt or "snap" advance of approximately 20° to 25° of ignition timing being introduced at a predetermined selected speed, for example, approximately 1800 rpm. In FIG. 5, the curve 104 represents the timing characteristic of the CDI system 10 without the provision of components 62, 64.

For example, with the component values discussed hereinbefore for a specific embodiment of the CDI system 10, a capacitor 62 having a component value of 0.029 microfarads or larger has been found suitable to achieve a desired advance characterstic. In various specific embodiments, the RC time constant of resistor 60 and capacitor 62 are selected to provide desired timing characterstics.

Thus, the CDI system 10 of the present invention provides a desirable advance characteristic for the normal operating range of engine speed, for example in excess of 1800 rpm, and a retarded ignition timing characteristic for engine speeds below 1800 rpm. Such an advanced timing characteristic for higher engine speeds is desirable for example, in engine applications that require timing advance characteristics in the normal operating range while at the same time avoiding timing advance characteristics for lower operating ranges and starting speeds so that kick back effects are avoided. For example, in an engine provided with a 10″ flywheel and with a specific configuration of the CDI system 10, the predetermined operating speed at which the snap advance is provided is approximately 1800 rpm. Correspondingly, if the same physical configuration CDI system 10 is utilized with a 6½ flywheel and with the components 60, 62 and 64 adjusted to result in the advance characteristic being introduced at approximately 1800 rpm, increased advance characteristics of 30° to 35° in ignition timing will result over the normal operation.

Considering now the operation of the CDI system 10 in providing the abrupt or snap advance characteristic, as the predetermined engine speed for example of 1800 rpm is exceeded, the SCR 58 is not triggered during the generation of the induced voltage waveform 48 in the control winding 24 after the capacitor 34 has been charged. Instead, the SCR 58 is triggered in accordance with the induced voltage represented by the waveform 37 on tne next occurring revolution of the engine flywheel 12.

Thus, during a cycle of operation and after the capacitor 34 has been charged during the previous revolution, the induced voltage waveform 37 in the control winding 24 triggers the SCR 58 and the spark plug at 30 is fired. The capacitor 34 is then charged during the generation of the induced voltage depicted by the waveform 40, and the induced voltage depicted by the waveform 48 in the control winding 24 does not trigger the SCR 58. This can be referred to as fire-charge operation as compared to normal charge-fire operation before the predetermined speed is exceeded.

Figure 6:
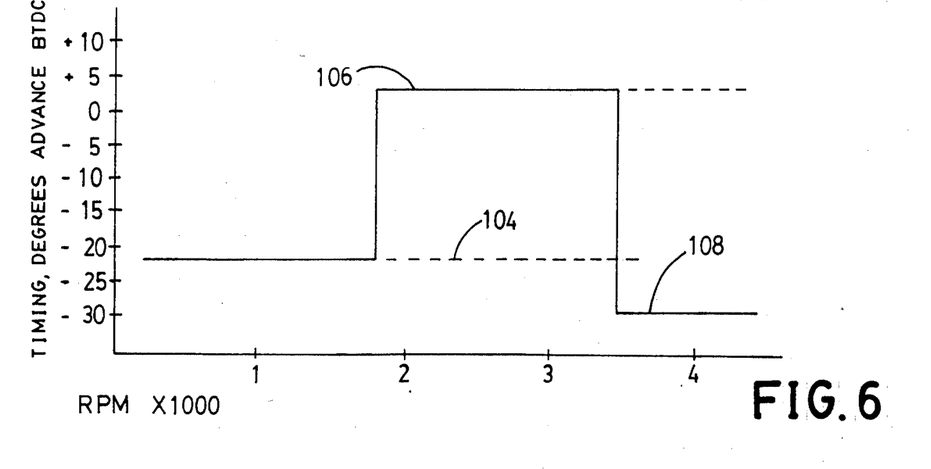
FIG. 6 is a graphic representation of the ignition timing characteristic with respect to engine speed provided by the capacitor discharge ignition system of FIGS. 1 and 2 in accordance with a third embodiment of the present invention.

In accordance with additional important aspects of the present invention, the CDI system 10 with component values of resistor 60 and capacitor 62 to achieve the snap advance characteristics of FIG. 5 is additionally provided with a capacitor 97 in parallel with the resistor 68 to achieve the timing characteristic of FIG. 6. With appropriate selection of the components 60, 62, 64, 68 and 97, the timing characteristic of FIG. 6 is provided with a snap advance portion 106 as a first predetermined speed, for example 1800 rpm, is exceeded and a snap retard characteristic 108 as a second predetermined speed is exceeded greater than the first predetermined speed. The snap retard characteristic 108 retards the timing beyond the timing characteristic 104 obtained without the provision of components 62, 64, and 97. As the second predetermined speed is exceeded, for example, approximately 3500 rpm, the CDI system returns to charge-fire operation for a given revolution as compared to the fire-charge operation during timing characteristic portion 106. In one illustrative example of a specific embodiment not to be interpreted in any limiting sense, a resistor 68 of 8.2 K ohms and a capacitor 97 of 0.047 microfarads were found to provide a suitable RC time constant and suitable operation.

Figure 8:
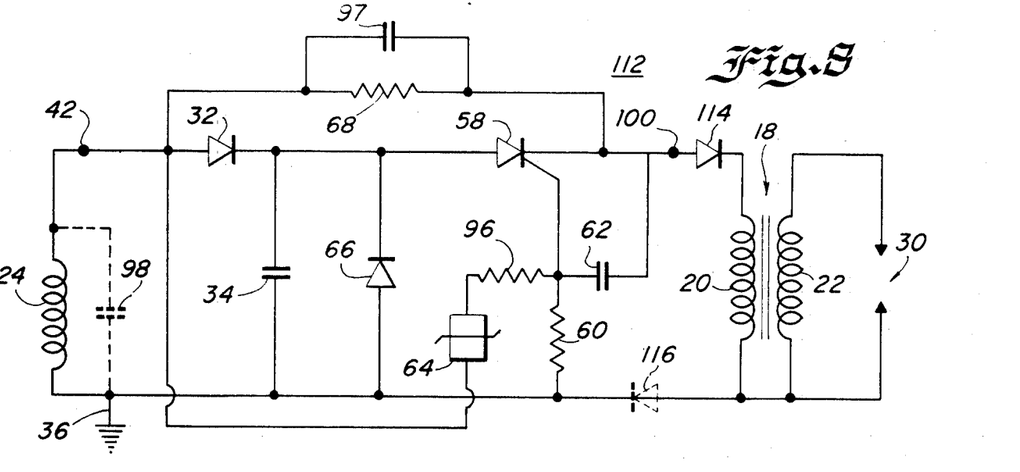
FIG. 8 is an electrical schematic diagram of the capacitor discharge ignition system of the present invention for operation in a reverse running application as compared to the arrangement of FIGS. 1 and 2.
Figures 9, 10:
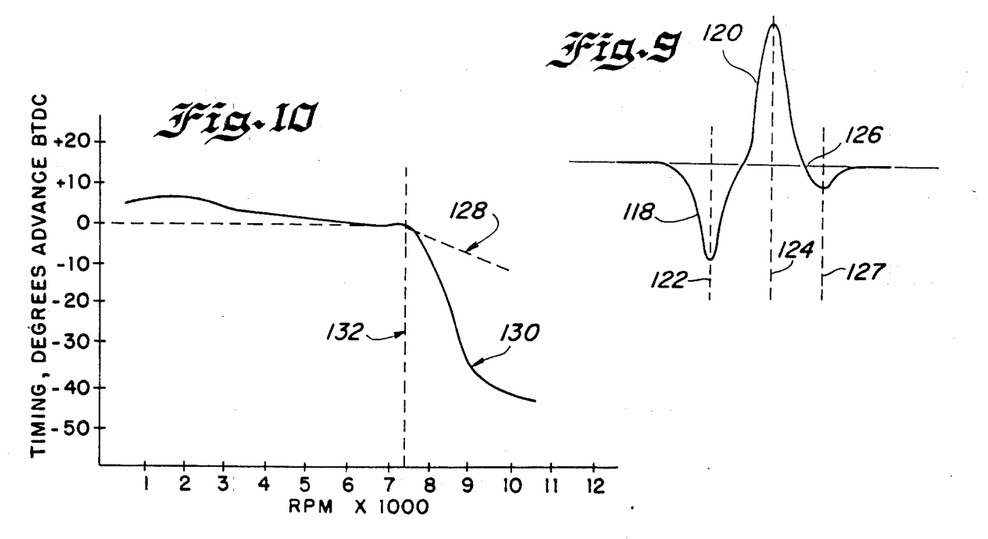
FIG. 9 is a graphic representation of the voltage waveforms present during the operation of the capacitor discharge ignition system of FIG. 8.
FIG. 10 is a graphic representation of the ignition timing characteristics with respect to engine speed provided by the capacitor discharge ignition system of FIG. 8.

Referring now to FIG. 8 and considering further aspects of the present invention, the CDI system 112 is utilized for reverse running engine applications wherein the flywheel 12 operates in the reverse or clockwise sense direction as compared to the arrow of FIG. 1 such that the magnet pole 19 is the leading magnet pole and the magnet pole 17 is the trailing magnet pole. Thus, the leading magnet pole 19 first approaches the core leg 23 during each revolution of the flywheel 12. The resulting voltage waveforms developed in the control winding 24 of the CDI system 112 are shown in FIG. 9. As the leading magnet pole 19 approaches the core leg 23, a voltage is induced in the control winding 24 represented graphically by the waveform 118.

As the leading magnet pole 19 approaches the core leg 21 and as the trailing magnet pole 17 approaches the core leg 23, a voltage of opposite polarity to that of the waveform 118 is induced in the control winding 24 represented graphically by the waveform 120. As the leading magnet pole 19 moves away from the core leg 21, the induced voltage in the control winding 24 will decrease as shown by the waveform 120. The reference line 122 of FIG. 9 corresponds approximately to the rotational position when the leading pole 19 is substantially aligned with the core leg 23.

Further, the reference line 124 of FIG. 9 corresponds approximately to the rotational position when the leading magnet pole 19 is substantially aligned with the core leg 21 and the trailing magnet pole 17 is substantially aligned with the core leg 23.

As the magnet 15 moves past the stator core 14, the polarity of the induced voltage in the control winding 24 reverses and a voltage of opposite polarity represented graphically by the waveform 126 is induced in the control winding. The reference line 127 corresponds to the rotational position when the trailing magnet pole 17 is substantially aligned with the core leg 21. The voltage waveforms 118, 120 and 126 are referenced with respect to the coil end 42 of the control winding 24. The CDI system 112 includes appropriate polarity reversal of the magnet poles 17, 19 or the winding sense of the windings 20, 22 and 24 as compared to the CDI system 10 of FIG. 2.

The CDI system 112 of FIG. 8 for reverse running includes a diode 114 arranged anode to cathode between the cathode of the SCR 58 and the primary winding 20. The diode 114 is provided to ensure stable operation. Referring now to FIG. 10, the CDI system 112 without the provision of the varistor 64, the capacitor 62, and the capacitor 97 provides ignition timing characteristics with respect to engine speed as depicted by a typical timing curve 128. With the provision of the varistor 64 and the capacitor 62, the ignition timing characteristics depicted by the curve 130 result with a relatively abrupt ignition timing retard characteristic being introduced at a predetermined speed denoted at 132. It should be noted that the CDI system 112 for reverse running provides a somewhat less abrupt and more gradual retard characteristic than that of the arrangement with characteristics depicted by FIG. 4.

In an alternate embodiment, the diode 114 is replaced by the diode 116 shown in phantom in FIG. 8 connected anode to cathode between the primary winding 20 and the resistor 60.

Further, the CDI system 112 for reverse running operation is provided with the capacitor 97 to provide additional ignition retardation to the timing curve 130 in FIG. 10.

In an alternate embodiment, the capacitor 97 is replaced by a capacitor 98 shown in phantom and connected in parallel with the control winding 24. The capacitor 98 provides the same ignition retardation effects as the capacitor 97 as discussed hereinbefore.

While there has been illustrated and described various embodiments of the present invention, it will be apparent that various changes and modifications thereof will occur to thosed skilled in the art. It is intended in the appended claims to cover all such changes and modifications as fall within the true spirit and scope of the present invention.

What is claimed and desired to be secured by Letters patent of the United States is:

1. In a capacitor discharge ignition system for use with and positioned adjacent a rotating magnetic field in synchronism with the operation of an engine the combination of:
   means for generating a charging supply and for generating a triggering supply in response to induced voltages and currents resulting from the rotating magnetic field, said charging supply and said triggering supply including a respective charing voltage waveform and a triggering voltage waveform having increased amplitudes in accordance with increased engine speed, said generating means comprising a control winding;

storage means connected to said generating means and being charged in response to said charging supply for storing said energy delivered from said charging supply;

ignition coil means for receiving energy and for generating an ignition voltage in response to said received energy; and means responsive to said storage means and said generating means for controlling the discharge of said storage means into said ignition coil means, said discharge controlling means comprising control circuit means and electronic switch semiconductor means having anode, cathode and control connections, said anode being connected to said storage means and said cathode being connected to said ignition coil means, said control circuit means comprising controlled conduction means connected between said control connection and a first end of said control winding, a resistor connected between said cathode and said first end of said control winding, a resistor connected between said control connection and a second end of said control winding, a capacitor connected between said control connection and said cathode connection, said control circuit means providing a predetermined change in ignition timing characteristics when the speed of the engine exceeds a predetermined speed and said charging voltage exceeds a predetermined voltage; wherein said predetermined change in ignition timing characteristics is an abrupt advance in ignition timing when said predetermined speed is exceeded, wherein said generating means further generates a second triggering supply, said second triggering supply being generated before said charging supply, said triggering supply being generated after said charging supply, said electronic switch semiconductor means being rendered conductive by said second triggering supply for engine speeds exceeding said predetermined engine speed and being rendered conductive by said triggering supply for engine speeds less than said predetermined engine speed.

2. In a capacitor discharge ignition system for use with and positioned adjacent a rotating magnetic field in synchronism with the operation of an engine the combination of:

means for generating a charging supply and for generating a triggering supply in response to induced voltages and currents resulting from the rotating magnetic field, said charging supply and said triggering supply including a respective charging voltage waveform and a triggering voltage waveform having increased amplitudes in accordance with increased engine speed, said generating means comprising a control winding;

storage means connected to said generating means and being charged in response to said charging supply for storing said energy delivered from said charging supply;

ignition coil means for receiving energy and for generating an ignition voltage in response to said received energy; and means responsive to said storage means and said generating means for controlling the discharge of said storage means into said ignition coil means, said discharge controlling means comprising control circuit means and electronic switch semiconductor means having anode, cathode and control connections, said anode being connected to said storage means and said cathode being connected to said ignition coil means, said control circuit means comprising controlled conduction means connected between said control connection and a first end of said control winding, a resistor connected between said cathode and said first end of said control winding, a resistor connected between said control connection and a second end of said control winding, a capacitor connected between said control connection and said cathode connection, said control circuit means providing a predetermined change in ignition timing characteristics when the speed of the engine exceeds a predetermined speed and said charging voltage exceeds a predetermined voltage; wherein said control circuit means further comprises a capacitor connected between said cathode connection of said electronic switch semiconductor means and said one end of said control winding, said predetermined change in ignition timing characteristics being an abrupt advance in ignition timing as a first predetermined speed in exceeded and an abrupt retard in ignition timing when a second predetermined speed is exceeded greater than first predetermined speed.

3. The capacitor discharge ignition system of claim 2 wherein said abrupt retard is greater than said abrupt advance.

4. In a capacitor discharge ignition system for use with and positionable adjacent a rotating magnetic field in synchronism with the operation of an engine, the combination of:

means for generating in sequence a first triggering supply, a charging supply and a second triggering supply in response to induced voltages and currents resulting from the rotating magnetic field, said charging supply including a charging voltage, said first and second triggering supplies including respective first and second triggering voltages, said charging voltage and said first and second triggering voltages having increased amplitudes in accordance with increased engine speed;

storage means connected to said generating means and being charged in response to said charging supply for storing said energy delivered from said charging supply;

ignition coil means for receiving energy and for generating an ignition voltage in response to said received energy; and means responsive to said storage means and said generating means for controlling the discharge of said storage means into said ignition coil means, said discharge controlling means comprising ignition timing control means for providing a change in ignition timing characteristics of the ignition voltage to the engine when a predetermined engine speed and a predetermined charging voltage are exceeded, said change in ignition timing being an abrupt advance in ignition timing as said predetermined engine speed and predetermined charging voltage are exceeded, said discharge controlling means being controlled to discharge said storage means into said ignition coil in accordance with said second triggering supply for engine speeds less than or equal to said predetermined engine speed, said discharge controlling means being controlled to discharge said storage means into said ignition coil in accordance with said first triggering supply for engine speeds greater than said predetermined engine speed, said discharge controlling means not being controlled to discharge said storage into said ignition coil means in accordance with said second triggering supply when said engine speed is greater than said predetermined engine speed.

5. The capacitor discharge ignition system of claim 4 wherein said ignition timing control means continues to provide said abrupt advance in ignition timing for engine speeds in excess of said predetermined speed.

6. The capacitor discharge ignition system of claim 4 wherein said abrupt advance in ignition timing is introduced essentially as a snap action over an extremely narrow range of engine speed when said predetermined speed is exceeded.

7. The capacitor discharge ignition system of claim 4 wherein said generating means comprises a control winding and a ferromagentic core having at least two core legs, said control winding being mounted on a first of said core legs.

8. The capacitor discharge ignition system of claim 7 wherein said discharge controlling means further comprises electronic switch semiconductor means having a main conduction path being connected between said storage means and said ignition coil means, said electronic switch semiconductor means further comprising a control connection, said ignition timing control means further comprising voltage divider means having an output connected to said control connection, said voltage divider means being connected across said generating supply and comprising a first resistive circuit and means for providing variable conduction characteristics, said output of said voltage divider means being connected between said first resistive circuit and said variable conduction means.

9. The capacitor discharge ignition system of claim 8 wherein said ignition timing control means further comprises a capacitor being connected at one end to the junction of said ignition coil means and said electronic semiconductor switch means and at the other end to said control connection of said electronic semiconductor switch means.

10. The capacitor discharge ignition system of claim 9 wherein said discharge controlling means further comprises a second resistive circuit being connected between a first end of said control winding and the junction of said electronic semiconductor switch means and said ignition coil means.

11. The capacitor discharge ignition system of claim 4 wherein said abrupt advance in ignition timing is in the range of approximately 15°–25°.

12. The capacitor discharge ignition system of claim 8 wherein said variable conduction characteristic providing means comprises a voltage dependent semiconductor device.

13. The capacitor discharge system of claim 12 wherein said voltage dependent semiconductor device is a varistor.

14. The capacitor discharge ignition system of claim 9 wherein said ignition timing control means further comprises a capacitor being connected at one end to a first end of said control winding and at the other end to the junction of said electronic semiconductor switch means and said ignition coil means, said ignition timing control means providing an abrupt retard in ignition timing as a second predetermined speed is exceeded in excess of said predetermined speed at which said abrupt advance is provided.

15. The capacitor discharge ignition system of claim 4 wherein said ignition timing control means further comprises means for providing an abrupt retard in ignition timing as a predetermined speed is exceeded in excess of said predetermined speed at which said abrupt advance is provided, said abrupt retard being provided relative to said abrupt advance in ignition timing.

16. The capacitor discharge ignition system of claim 15 wherein said abrupt retard in ignition timing is greater than said abrupt advance.

17. A method for controlling the ignition timing of an engine provided with a capacitor discharge ignition system to provide an abrupt advance in ignition timing at a predetermined engine speed and at a predetermined charging voltage, the capacitor discharge ignition system comprising a ferromagnetic core having at least two legs, a control winding disposed on a first of the legs, a storage capacitor for receiving induced voltages and currents from the control winding, an ignition coil for receiving energy from said storage capacitor and generating an ignition voltage in response to the received energy, and control circuitry for controlling the discharge of the storage capacitor into the ignition coil in response to the control winding, the method comprising the steps of:

generating a rotating magnetic field in synchronism with the operation of the engine;

disposing the ferromagnetic core adjacent the rotating magnetic field such that voltages and currents are induced in the control winding, said first leg of said core being disposed such that the rotating magnetic field first approaches said first leg when the engine is revolving in the normal direction of operation;

inducing in sequence in said control winding for each revolution of the engine a first triggering voltage, a second charging voltage and a third triggering voltage, the amplitudes of the induced voltages increasing with increasing engine speed;

charging the storage capacitor during each revolution of the engine in response to said second charging voltage;

discharging the storage capacitor into the ignition coil in response to said third triggering voltage for engine speeds less than a predetermined speed; and discharging the storage capacitor into the ignition coil in response to said first triggering voltage when said engine speed is equal to or greater than said predetermined speed.

18. A capacitor discharging ignition system for use with an engine comprising
a first capacitor,
charge means for charging said first capacitor, said charge means comprising a first winding,
an ignition coil having a primary winding and a secondary winding, a core, said first winding and said primary winding and said secondary winding being disposed on said core, triggerable switch means for discharging said first capacitor into said primary winding, said switch means having multiple electrodes including a control electrode and being arranged to conduct current from said first capacitor to said primary winding in response to the application of an electrical trigger signal to said control electrode, said electrical trigger signal being generated in response to the generation of electrical energy in at least one of said windings, engine ignition timing step retard means for abruptly retarding the timing of the application of said trigger signal to said control electrode at a predetermined operating speed of said engine, said engine ignition timing step retard means consisting of passive electrical circuit components, said passive components comprising variable impedance means directly electrically connected between a first end of said first winding and said control electrode for forming a current carrying path therebetween and a second capacitor directly electrically connected between said control electrode and another one of said multiple electrodes of said switch means and a resistor directly electrically connected to said second capacitor to form an RC timing circuit for determining the amount of said timing retard, said variable impedance means comprising means for providing a relatively high impedance during a first portion of the operating speed range of said engine and for providing a relatively low impedance during a second portion of said operating speed range of said engine, said second portion of said operating speed range including said predetermined operating speed of said engine.

19. A capacitor discharge ignition system as recited in claim 18 wherein said step retard of the ignition timing continues for engine speeds in excess of said predetermined engine speed.

20. A capacitor discharge ignition system as recited in claim 18 wherein the amount of retard in said step retard of the ignition timing is variable in accordance with the values of said resistor and said second capacitor in said RC timing circuit.

21. A capacitor discharge ignition system as recited in claim 18 wherein said variable impedance means comprises a varistor.

22. A capacitor discharge ignition system as recited in claim 18 wherein said abrupt retardation of the ignition timing is approximately 15 to 20 degrees retardation.

23. A capacitor discharge ignition system as recited in claim 18 wherein said passive components further comprise a third capacitor directly electrically connected between said first end of said first winding and said second capacitor.

24. A capacitor discharge ignition system as recited in claim 23 wherein said abrupt retardation of the ignition timing is the range of from 20 degrees to 30 degrees.

25. A capacitor discharge ignition system as recited in claim 18 wherein said passive components further comprise a third capacitor electrically connected across and in parallel with said first winding.

26. p A capacitor discharge ignition system for use with an engine comprising
a first capacitor, charge means for charging said first capacitor, said charge means comprising a first winding, an ignition coil having a primary winding and a secondary winding, a core, said first winding and said primary winding and said secondary winding being disposed on said core, triggerable switch means for discharging said first capacitor into said primary winding, said switch means having multiple electrodes including a control electrode and being arranged to conduct current from said first capacitor to said primary winding in response to the application of an electrical trigger signal to said control electrode, said electrical trigger signal being generated in response to the generation of electrical energy in at least one of said windings, engine ignition timing step advance means for abruptly advancing the timing of the application of said trigger signal to said control electrode at a predetermined operating speed of said engine, said engine ignition timing step advance means consisting of passive electrical circuit components, said passive components comprising variable impedance means directly electrically connected between a first end of said first winding and said control electrode for forming a current carrying path therebetween and a second capacitor directly electrically connected between said control electrode and another one of said multiple electrodes of said switch means, a resistor directly electrically connected to said second capacitor to form an RC timing circuit for determining the amount of said timing advance and means for carrying electrical current from said first end of said first winding to said second capacitor, said variable impedance means comprising means for providing a relatively high impedance during a first portion of the operating speed range of said engine and for providing a relatively low impedance during a second portion of said operating speed range of said engine, said second portion of said operating speed range including said predetermined operating speed of said engine.

27. A capacitor discharge ignition system as recited in claim 26 wherein said step advance of the ignition timing continues for engine speeds in excess of said predetermined engine speed.

28. A capacitor discharge ignition system as recited in claim 26 wherein the amount of advance in said step advance of the ignition timing is variable in accordance with the values of said resistor and said second capacitor in said RC timing circuit.

29. A capacitor discharge ignition system as recited in claim 26 wherein said variable impedance means comprises a varistor.

30. A capacitor discharge ignition system as recited in claim 26 wherein said step advance of the ignition timing is approximately 20 degrees to 25 degrees.

31. A capacitor discharge ignition system as recited in claim 26 further comprising engine ignition timing step retard means for providing an abrupt retardation of the ignition timing at a second predetermined operating speed of said engine, said engine ignition timing step retard means comprising a third capacitor directly electrically connected between said second capacitor and said first end of said first winding.

32. A capacitor discharge ignition system as recited in claim 26 further comprising engine ignition timing step retard means for providing an abrupt retardation of the ignition timing at a second predetermined operating speed of said engine, said engine ignition timing step retard means comprising a third capacitor electrically connected across and in parallel with said first winding.

33. A capacitor discharge ignition system for use with an engine comprising
  a first capacitor,
  charge means for charging said first capacitor, said charge means comprising a first winding,
  an ignition coil having a primary winding and a secondary winding,
  a core, said first winding and said primary winding and said secondary winding being disposed on said core,
  triggerable switch means for discharging said first capacitor into said primary winding, said switch means having multiple electrodes including a control electrode and being arranged to conduct current from said first capacitor to said primary winding in response to the application of an electrical trigger signal to said control electrode,
  said electrical trigger signal being generated in response to the generation of electrical energy in at least one of said windings,
  engine ignition timing change means for changing the timing of the application of said trigger signal to said control electrode at a predetermined operating speed of said engine, said engine ignition timing change means comprising means for enabling said capacitor discharge ignition system to operate in one of two operational modes at operating speeds of said engine below said predetermined operating speed of said engine and in the other of said two operational modes at operating speeds of said engine above said predetermined operating speed, said two operational modes comprising a charge-fire operational mode and a fire-charge operational mode.

34. A capacitor discharge ignition system as recited in claim 33 wherein said one operational mode comprises said charge-fire operational mode and wherein said other operational mode comprises said fire-charge operational mode.

35. A capacitor discharge ignition system as recited in claim 33 wherein said enabling means further comprises means for enabling said capacitor discharge ignition system to operate in said one operational mode at operating speeds above a second predetermined operating speed of said engine, said second predetermined operating speed being greater in magnitude than said first-mentioned predetermined operating speed.

36. A capacitor discharge ignition system as recited in claim 35 wherein said one operational mode comprises said charge-fire operational mode and wherein said other operational mode comprises said fire-charge operational mode.

* * * * *

UNITED STATES PATENT AND TRADEMARK OFFICE
CERTIFICATE OF CORRECTION

PATENT NO. : 4,576,138
DATED : March 18, 1986
INVENTOR(S) : Ronald J. Wolf

It is certified that error appears in the above-identified patent and that said Letters Patent are hereby corrected as shown below:

Column 11, line 3, "charing" should be --charging--;

Column 12, line 31, "in" should be --is--;

Column 12, line 33, --said-- should be inserted after "than";

Column 13, line 28, "ferromagentic" should be --ferromagnetic--;

Column 14, line 62, "discharging" should be --discharge--;

Column 15, line 61, --in-- should be inserted after "is";

Column 15, line 66, "p" should be deleted.

Signed and Sealed this

Fifteenth Day of July 1986

[SEAL]

Attest:

DONALD J. QUIGG

Attesting Officer

Commissioner of Patents and Trademarks